April 18, 1944. H. J. NESS 2,346,698
METHOD OF PRODUCING PROTECTIVE ATMOSPHERES
Filed March 22, 1941 2 Sheets-Sheet 1
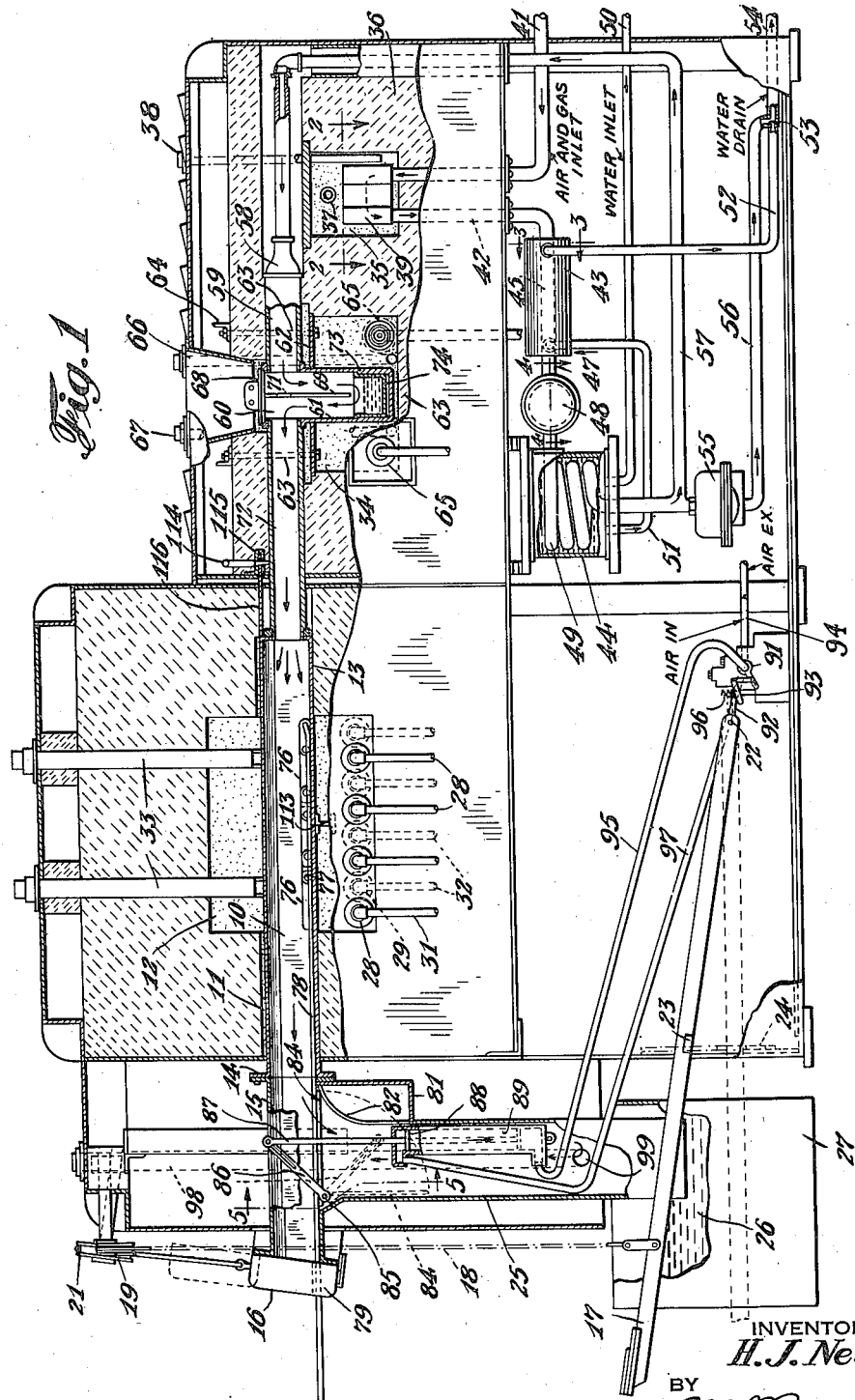
INVENTOR
H. J. Ness
BY
M. J. Reynolds
ATTORNEY April 18, 1944. H. J. NESS 2,346,698
METHOD OF PRODUCING PROTECTIVE ATMOSPHERES
Filed March 22, 1941 2 Sheets-Sheet 2
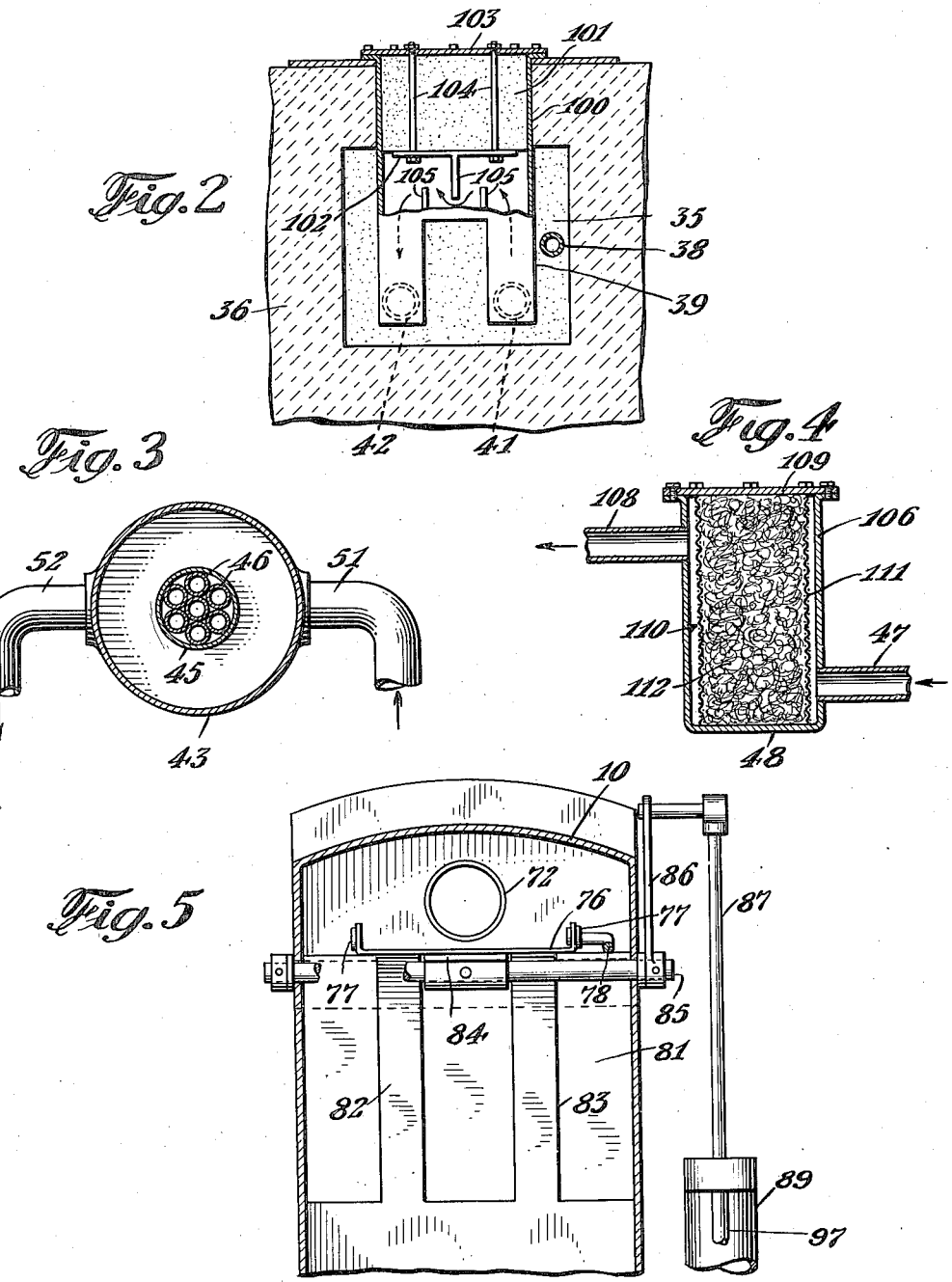
INVENTOR
H. J. Ness
BY M. J. Reynolds
ATTORNEY Patented Apr. 18, 1944

2,346,698

UNITED STATES PATENT OFFICE 2,346,698

METHOD OF PRODUCING PROTECTIVE ATMOSPHERES

Harold J. Ness, Bloomfield, N. J., assignor to Metallurgical Processes Co., a partnership consisting of Harold J. Ness and Martin A. Ness, both of Nutley, and Alfred R. Becker and Marvin J. Reynolds, both of Montclair, N. J.

Application March 22, 1941, Serial No. 384,641

19 Claims. (Cl. 148—17)

This invention relates to furnaces and more particularly to a method of and means for producing furnace atmospheres suitable for the heat treating or carburization of metals and other materials which are liable to contamination by the usual furnace atmospheres.

In the usual furnace atmospheres it is not possible to heat treat metals, such as iron and steel, without considerable oxidation and decarburization thereof. The carbon dioxide, water vapor or any free oxygen in the furnace act to scale or oxidize the metal, and the hydrogen and nitrogen, in the presence of traces of oxygen or water vapor, are strong decarburizing agents.

Heretofore, in the operation of heat treating atmosphere furnaces efforts have been made to prevent oxidation and decarburization by regulating the ratios between the various ingredients of the furnace atmosphere. Stansel and Dantsizen in the General Electric Review for March and May, 1939, have shown, however, that the ratio between the various components of a furnace atmosphere which will not scale are radically different from the ratios required in order to prevent carburization or decarburization of steel. It, therefore, has not been possible to prevent both oxidation and decarburization or carburization of the treated metal merely by adjustment of the ratios of the reducing gases, such as carbon monoxide, hydrogen and methane, to the oxidizing gases, such as carbon dioxide and water vapor. The present invention is concerned with the elimination of these difficulties and in obtaining a furnace atmosphere for the heat treating of metals in which all three of these detrimental actions are eliminated. This is accomplished by introducing an additional component into the furnace atmosphere, namely, lithium or a compound of lithium, which overcomes the tendency of the heat treating atmosphere to either effect oxidation, carburization or decarburization of the metals being heated and which, therefore, renders it unnecessary to effect a balance between the various components resulting from combustion of the gases.

In my prior Patent No. 2,181,093, granted November 21, 1939, there is described one method of producing a lithium containing atmosphere in a furnace in which various metals may be heated in the presence of ordinary combustion gases without detrimental oxidation or decarburization. In accordance with the disclosure of that patent, a compound of lithium, such as the carbonate, is introduced into the furnace atmosphere in powdered form. In order to obtain a uniform flow of the compound in minute quantities, the compound is atomized by agitation and by passing air or other gas therethrough to produce a suspension of the compound in the gas. The required quantity of the compound laden gas may then be introduced into the furnace mixed with the air or fuel or independently thereof. It is believed that in the heat of the furnace the compound or a portion thereof is reduced to lithium oxide which reacts with the carbon monoxide present in the furnace gases to liberate lithium metal in accordance with the following equation:

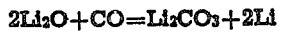

$$2Li_2O + CO = Li_2CO_3 + 2Li$$

The lithium is thus freed to combine with the oxygen of the furnace atmosphere or with oxygen that may be occluded in the metal being heated. The lithium carbonate of the above reaction is again thermally broken down to lithium oxide, liberating carbon dioxide. The reaction is then repeated with the lithium oxide so formed.

In my copending application Ser. No. 333,482, filed April 24, 1940, and entitled "Atmosphere furnace," there is disclosed a method and apparatus for introducing lithium or lithium compounds into a furnace for accomplishing the purpose of the aforesaid patent. In accordance with the disclosure of said application, the lithium, or a compound or mixtures of compounds thereof, is vaporized and introduced into the treating chamber of the furnace by means of a carrier gas. This carrier gas may be a non-oxidizing medium, such as nitrogen or hydrogen, although a gas resulting from the combustion of a liquid or gaseous fuel is preferred. Air may also be employed as a carrier gas, if desired.

The amount of lithium required for conditioning the atmosphere of the furnace in the manner described in said later application is extremely small; for instance, a muffle furnace heated to about 1400° F. and having a volume of approximately two thousand cubic inches and a gas flow of approximately one hundred cubic feet per hour, may be completely conditioned for a period of fifteen hours or more with six ounces of a lithium compound mixture composed of 40% lithium chloride and 60% lithium carbonate.

The present invention is an improvement upon the invention of said application, one of the objects thereof being to still further reduce the amount of lithium compound required to condition the atmosphere.

Another object is to produce a heat treating atmosphere in which there will be no discoloration or staining of the metal being heated.

A further object is to permit generation or production of a lithium containing protective atmosphere at relatively low temperatures.

Another object is to provide a furnace which may be employed interchangeably for both heat treating of metals or for carburization of iron or steel.

A further object is to provide a furnace atmosphere in which bright or clean carburizing may be effected and further in which such carburizing may be accomplished at relatively low temperatures and at higher rates of penetration than has been obtained in prior art methods.

A still further object is to effect an economy in the use of the carburizing gas.

Still another object is to provide a completely dry atmosphere in the furnace throughout the entire heating chamber and during all conditions of operation thereof.

A still further object is to provide a novel furnace construction in which the foregoing objects may be accomplished.

Other objects and advantages will hereinafter appear.

The detrimental effects of water vapor in the furnace atmosphere has been long appreciated and extreme precautions have been taken in an effort to prevent its introduction into the furnace. For this purpose involved refrigerating and dehydrating apparatus has been provided in order to reduce the moisture content in the products of combustion to a negligible degree. However, such methods have not been effective to produce a dry atmosphere in the furnace since in the reheating of the gases to the furnace temperature, water vapor is again formed. The introduction of lithium or its compounds into the furnace atmosphere, as set forth in the aforesaid application, overcomes or neutralizes the detrimental effects of water vapor in the furnace atmosphere or acts to prevent its formation, so that the provision of drying apparatus is unnecessary. However, applicant has discovered that improved operation of the furnace may be obtained by the elimination of a portion of the water vapor from the treating gases prior to the introduction thereof into the heating chamber, this improvement residing primarily in the ability to produce the non-oxidizing and non-decarburizing heat treating atmosphere or the desired carburizing atmosphere with a reduced quantity of lithium compound; in producing the requisite amount of lithium in the atmosphere at lower temperatures; in the maintenance of such protective atmosphere at materially lower heat treating or carburizing temperatures; and in an improvement in the surface condition of the treated metals.

In accordance with the present invention the air and fuel mixture may be burned in the usual manner or they may be cracked by externally applied heat without combustion, either operation producing an increase in the moisture content above that of the original mixture. The cracked or burned gases are then partially dehydrated by cooling, preferably to a temperature of from 50 to 100 degrees F. Further cooling of the gases or the use of supplemental drying apparatus is of no advantage since in the reheating of the gases to the treating temperature, water vapor will again be formed in amounts up to 5% or more. The condensed water vapor is then removed from the cooled gases and the vapor produced from heating of a lithium compound is introduced into the gas. The gases are then reheated and introduced in the heating chamber of the furnace. The formation of water vapor ordinarily incident to the reheating of the gases is either inhibited or its effectiveness neutralized by the presence of the lithium in the atmosphere. The partial removal of the water vapor greatly reduces the work which the lithium is required to do and therefore, enables the atmosphere to be conditioned with a lesser amount of lithium. For instance, a furnace of the muffle type ordinarily requiring the consumption of six ounces of lithium compounds over a period of fifteen hours for the conditioning of the furnace, when no drying is employed, may, with the removal of a portion of the water vapor, be conditioned with an equal amount of the same compound for a period of approximately sixty hours. Moreover, whereas it required a temperature of about 1750° F. to generate the required amount of lithium to condition the atmosphere without the removal of water vapor, a sufficient quantity to effect the desired result may be produced at a temperature of about 1400° F. after removal of the aforesaid portion of the water vapor. The activity of the lithium in the furnace atmosphere is dependent to some extent upon the temperature existing in the furnace, but when the water vapor is reduced by the precooling of the gases the amount of lithium required to neutralize its effect is so small that sufficient activity is obtained at much lower temperatures than would otherwise be possible and a satisfactorily conditioned heat treating atmosphere may be created and maintained at temperatures as low as 600° F. or even lower. Another very important advantage in the use of extremely small quantities of lithium in the treating atmosphere is the absolutely clean and bright surface of the treated parts on their removal from the furnace. This bright surface is obtained both when using a non-carburizing atmosphere as in annealing, drawing, etc., and when using a carburizing mixture in the furnace. As will hereinafter appear, and as pointed out in my copending application, Serial No. 233,637, filed October 6, 1938, while lithium is effective to prevent carburization in ordinary heat treating atmospheres, it acts in the presence of a carburizing gas mixture to accelerate carburization, and to enable carburization to be carried out at such lower temperatures than heretofore has been possible in gas carburizing processes.

The invention will best be understood by reference to the accompanying drawings, in which:

Fig. 1 is a vertical section view of an atmosphere furnace embodying the present invention;

Fig. 2 is a sectional view of the gas generating chamber taken on the line 2—2 of Fig. 1;

Fig. 3 is a vertical sectional view of a gas precooling chamber taken on the line 3—3 of Fig. 1;

Fig. 4 is a horizontal sectional view of the gas cleaning chamber taken on the line 4—4 of Fig. 1; and Fig. 5 is a vertical sectional view of a portion of the muffle and quenching chute taken substantially on the line 5—5 of Fig. 1.

Referring first to Fig. 1, the furnace there shown comprises a muffle 10 of rectangular cross section composed preferably of a heat resisting metal such as nickel or nickel-chromium alloy. Since the interior of the muffle is continuously provided with a protective or non-oxidizing atmosphere, the muffle may be composed of an iron or steel inner lining, preferably welded at the ends to the nickel or nickel-chromium alloy jacket, or it may be composed entirely of copper plated iron or steel. The muffle 10 extends, at the forward end, through a rectangular opening 11 in the refractory combustion chamber 12. The rear of the muffle is shown terminating within an opening 13 in the rear wall of the refractory combustion chamber 12. The forward end of the muffle is provided with a flange 14 to which is secured a muffle extension 15 provided with a suitable door 16 at its outer end. The door may be controlled by means of a foot pedal 17 connected thereto through a flexible cable 18 passing over suitable pulleys 19 and 21. The pedal 17 is pivoted at 22 and is adapted to be held in any suitable raised position by means of a latch 23 thereon engaging in suitable notches in the serrated plate 24, more fully shown in the aforementioned application, Serial No. 333,482. Extending downwardly from the muffle extension 15 is a quenching chute 25 which terminates beneath the body of a quenching medium 26 contained within a suitable receptacle 27.

The muffle 10 is heated by two series of burners 28 and 29 extending into the combustion chamber 12 at opposite sides thereof beneath the muffle 10. The burners 28 and 29 are supplied with a combustible mixture of air and gas by conduits 31 and 32, respectively, in any suitable manner, as for instance, as shown in the aforesaid application, Serial No. 333,482. The combustion chamber 12 is vented by a plurality of pipes 33 extending to a point just above the center of the muffle 10 through the refractory insulation and terminating above the furnace shell. This location of the vents allows the combustion gases passing up about the sides of the muffle, to sweep over the top thereof, and results in an extremely uniform heating of the muffle.

Situated to the rear of the combustion chamber is a vaporizing chamber 34 and a gas generating chamber 35. The gas generating chamber is a substantially rectangular recess contained within a mass of refractory heat insulating material 36. It is provided with a suitable burner 37 and a vent 38. Disposed within the chamber 35 is a U-shaped cracking unit 39, also shown in Fig. 2. An air and gas mixture is introduced through the conduit 41 into one arm of the U-shaped cracking chamber and is withdrawn therefrom through the opposite arm by way of the conduit 42. The gases become heated in the chamber 39 to the cracking temperature and are subsequently cooled to remove the major portion of the water vapor therefrom by means of the heat exchanger elements 43 and 44. The heat exchanger 43 comprises a cylindrical casing through the center of which passes a conduit 45 containing a group of copper tubes 46. The conduit 42 is connected to one end of the tube 45 and the gases pass through and between the copper tubes 46 into an outlet conduit 47 from which the partially cooled gases pass into a gas cleaning chamber 48 and thence into the coil 49 of the second heat exchanger 44. Cooling water is circulated from an inlet conduit 50 through the chamber 44 about the gas cooling coil 49 and then, by means of the conduit 51, through the casing 43 outside of the gas cooling tube 45. The water is then discharged through the conduit 52 and a Venturi nozzle 53 into a suitable drain pipe 54. The water vapor contained within the gases circulated through the pre-cooler 43 and the cooler 44 are collected in a trap 55 from which they are withdrawn through the conduit 56 by the suction action produced by the venturi 53. The cooled and partially dried gases are then conducted by means of conduit 57 through an expansion coupling 58, by which the velocity thereof is suitably retarded, and thence by the conduit 59 into the lithium compound vaporizing chamber 60.

The vaporizing chamber comprises a metal pot 61 depending into the combustion chamber 34 from a plate 62 which forms the top wall of the chamber 34. The plate 62 is supported by hanger rods 63 from angle irons 64 extending transversely of the furnace. The pot 61 is spaced above the bottom wall of the chamber 34 to permit gas circulation therebeneath and to permit downward expansion of the pot as it is brought up to temperature. The chamber is provided with a pair of burners 65 to which a combustible air and gas mixture is supplied. The chamber 34 is vented by means of vent tubes 66 and 67 extending from adjacent the bottom of the chamber 34 to above the furnace casing. The pot 62 is provided with a close fitting cover 68 from which a partition plate 69 is suspended. The partition plate has an opening 71 therein in substantial alignment with the gas inlet conduit 59 and with the gas outlet conduit 72 by which the gases are conducted into the muffle 10. The pot 61 has an annular shoulder or seat 73 adjacent its lower end and supported thereon is a flanged cup 74 adapted to contain a lithium compound or a mixture of lithium compounds. The burners are adjusted by a suitable pyrameter control, not shown, so as to maintain the lithium compounds at a suitable temperature to produce substantial vaporization thereof. The carrier gases entering the pot 61 are deflected in part by the partition plate 69 so as to pass over the surface of the molten compounds whereby to entrain a portion of the vaporized material. The amount of gas deflected by the plate 69 may be regulated by the size of the opening 71.

The parts to be heated may be placed directly on the floor of the muffle 10 but I prefer to employ a conveyor and in Figs. 1 and 5 I have shown the same as comprising a series of inverted U-shaped plates 76 secured together by means of links 77 and adapted to rest on the floor of the muffle. The rear plate 76 has a rod 78 secured thereto which is adapted to extend through a suitable slot 79 in the furnace door 16.

The quenching chute 25 adjacent its upper end is provided at the rear thereof with a rectangular recess 81 across which a pair of rails 82 and 83 extend. Pivoted at the juncture of the upper end of the chute 25 and the forward end of the muffle extension 15 is a plate 84 which normally rests against the forward wall of the chute 25, as shown in dotted lines. This plate is secured to a shaft 85 extending externally of the chute where it is provided with an operating arm 86 pivoted to the upper end of a plunger rod 87 having a plunger 88 working within a cylinder 89. The plunger is adapted to be operated pneumatically to move the plate 84 from the position shown in dotted lines in Fig. 1 to the horizontal position shown in full lines so as to bridge the upper end of the chute 25. It is controlled by means of a suitable valve 91 operated by means of the foot pedal 17 through the treadle extension 92 and the bell crank lever 93, so that upon depression of the pedal 17 to open the door 16, air from the air supply line 84 is caused to pass through the conduit 85 into the lower end of the cylinder 89 to raise the plunger 81 and thus to move the plate 84 to the horizontal position. In this position the conveyor element 76 may be withdrawn to the forward end of the furnace adjacent the door for loading. After they have been loaded and positioned within the muffle 10, the door 16 may be closed by the upward movement of the pedal 17. The spring 96 reverses the position of the valve 91 so as to exhaust the lower portion of the cylinder 89 and supply air to the upper portion thereof through the conduit 87, thereby returning the bridging plate 84 to its vertical position adjacent the front wall of the chute 25. When the heat treating has been completed, the rod 78 is drawn forward, thus pulling the conveyor elements to the throat of the chute 25 down which they then travel by gravity, permitting the load thereon to be dumped through the chute 25 and into the quenching bath 26. It will be noted, therefore, that after the parts have been loaded in the furnace and the door closed, they are continuously subjected to the atmosphere introduced through the conduit 72 into the muffle 10 until the final quenching. The atmosphere for the muffle 10 is exhausted through the vent 98 which extends from a point 99 adjacent the lower end of the quenching chute 25, upwardly to above the level of the muffle. The cracking chamber 39, as stated, consists of a U-shaped casting, as viewed in Fig. 2. During the cracking process, particularly when employing a carburizing mixture, small amounts of heavy tar-like products deposit on the walls of the cracking chamber. In order to permit ready cleaning of the cracking chamber from time to time, the rear wall thereof is formed of a tubular extension 100 terminating exteriorly of the furnace shell. The tubular extension 100 is closed by a refractory plug 101 clamped between end plates 102 and 103 by tie bolts 104. The plate 103 is bolted to the flanged end of the extension 100 to permit the convenient removal of the plug 101 for cleaning of the cracking chamber. Fins 105 are provided on the inner plate 102 and the inner wall of the cracking chamber to deflect the gases within the cracking chamber in a more tortuous path and to produce a turbulence of the gases and a scrubbing action thereof on the heated walls of the cracking chamber.

Further quantities of this heavy tar-like substance condense out upon cooling of the gases and it is for the purpose of removing such products from the gases, and preventing their deposit within the main cooling coils 49, that the cleaner 48 is employed. As shown in Fig. 4, this cleaner comprises a tubular chamber 106 having the gas inlet 47 at one end and the gas outlet 108 at the other end. The flanged end of the chamber 106 is closed by a removable plate 109 by means of which a suitable filter 110 may be inserted or removed. The filter may be of any suitable construction and as shown comprises a tube 111 of wire mesh containing a mass 112 of porous absorbent material, such as cotton fibers.

Provision is also made for the complete removal of the muffle 10, if desired, as for repair or replacement. The muffle rests directly upon the furnace refractory and an alloy I-beam 113 extending across the combustion chamber 12. It is locked in place by a removable pin 114 extending through an aperture in bracket 115 carried by the rear frame wall of the heating chamber and through an aperture in a plate 116 extending rearwardly from the muffle. The forward end of the muffle passes freely through the refractory wall of the furnace and is thus free to expand forwardly when it is brought up to heat. Should it be desirable to remove the muffle 10 for any purpose, it is only necessary to disconnect the muffle extension 15 and quenching chute 45, remove the pin 114, and withdraw the muffle from the furnace.

In the operation of the furnace the cup 74 containing the desired lithium compounds is inserted within the pot 61 and the burners in the various chambers 12, 34 and 35 ignited. When the cracking chamber 39 comes up to the required temperature, preferably around 1900° F., an air and gas mixture is introduced therein through the conduit 41. In case a heat treating atmosphere is desired, this mixture may be an ordinary combustible mixture of air and natural or manufactured gas. I prefer to employ a gas such as propane in the cracking chamber due to its uniformity and in such case the mixture may consist of approximately fifteen parts air to one part propane. When a carburizing atmosphere is desired, this mixture may be reduced to four or five parts air and one part propane. The gases are cracked within the chamber 39 and, as stated, pass through the cooling chambers 43 and 44 and gas cleaner 48 where the temperature is reduced and the major portion of the water and heavy tars are removed from the gas. The gas is then passed into the pot 61 which is heated to a sufficient temperature by means of the burners 65 to vaporize a portion of the lithium compound within the cup 74. This vapor is picked up by the incoming gas and carried by it into the muffle 10 in which the work is placed.

The preferred charge within the cup 74 comprises a mixture of lithium carbonate and lithium chloride in the proportion of about 60% of the former and 40% of the latter, by weight, which has been fused together at a temperature of about 1800° F. With a fused mixture of these proportions, sufficient vaporization occurs at a temperature of about 1400° F. to create the desired atmosphere in the muffle. The amount of lithium salt required to produce a non-oxidizing and non-decarburizing and non-staining atmosphere in the muffle 10 is very small. With a muffle heated to 1400° F. and having a volume of approximately 2000 cubic inches and provided with a mixture of air and gas entering the gas generator at the rate of from 200 to 300 cubic feet per hour, a six ounce charge of lithium salts composed of 40% lithium chloride and 60% lithium carbonate, heated in the vaporizer to a temperature of 1500° F., will supply sufficient lithium to the atmosphere within the muffle to maintain the same for a period of sixty hours or more in a condition which is neutral to steel so that neither oxidation, nor decarburization, nor staining thereof will occur. While it is desirable to maintain the charge in the vaporizing chamber at a temperature of at least 1500° F. for the salt mixture specified, the muffle 10 may be operated at temperatures ranging from 600° F. up to the maximum temperature that the muffle will withstand.

While the exact nature of the chemical reactions occurring in the charge in the cup 74 or between the generated vapors and the combustion gases from the gas generator 39 is not fully known, the following explanation is supported by a large amount of experimental evidence. The material leaving the charge in the cup 74 and entrained by the combustion gas appears to be the vapor of lithium oxide, and lithium metal. The lithium oxide appears to react with the carbon monoxide in the carrier gases to liberate lithium metal in accordance with the equation:

$$2Li_2O + CO = Li_2CO_3 + 2Li$$

The lithium is thus freed to combine with any oxygen in the furnace from whatever source, and the lithium carbonate of the above reaction is again broken down to lithium oxide liberating carbon dioxide. The reaction is then repeated with the lithium oxide so formed.

It should be noted that although the major portion of the water vapor is removed by the condenser 44 from the carrier gas introduced into the muffle, upon reheating of these gases to the muffle temperature further reactions occur in the gas mixture causing the formation of additional quantities of water vapor. The addition of the lithium vapor to the muffle gases has the effect of either reducing any water vapor which so forms at the instant of formation or precludes the formation thereof by interaction with the oxygen before it has an opportunity to combine with the hydrogen to form water vapor. Due to the much smaller amount of water vapor which is formed by reaction within the muffle or within the conduits leading thereto as compared with the amount which would be present in the absence of the condensing apparatus, the amount of lithium required to reduce or prohibit the formation of such water vapor is extremely small. This is true both when employing a heat treating mixture and a carburizing mixture within the muffle. In both cases the parts treated are neither oxidized, discolored, or stained in any manner by the atmosphere and come out of the furnace in a bright and clean condition.

The lithium in addition to protecting the parts from oxidation or decarburization in the case of the heat treating atmosphere, also serves in the case of the carburizing atmosphere to accelerate carburization to such an extent that penetration of carbide is obtained with a much less concentrated hydrocarbon atmosphere than heretofore. For instance, in ordinary gas carburization employing hydrocarbon gases such as propane, it is the practice to employ approximately one part of propane to two parts of air in order to obtain carburization at a rate which is sufficiently fast to render the process commercially practical. Mixtures of such concentration, however, are sooty in nature and deposit large quantities of carbon or soot upon the parts forming hard carbon scales thereon. As previously stated, applicant is enabled to employ a mixture of one part propane to four or five parts of air, which dilution produces a mixture which is substantially completely free of soot. The rate of carburization at such dilutions is approximately twice that which is obtained with the ordinary carburizing mixture of two parts air to one part propane, or of the order of .02 inch per hour. The rate of penetration is largely independent of the carburizing temperature above about 1500° F. This phenomenon is not experienced in the ordinary practice in which the carburization increases with increase in temperature, and is believed to result from the fact that the surface is maintained in a clean condition at all times during the carburizing process, and the oxidizing and deoxidizing phase of the usual carburizing equilibrium is eliminated. The ability to carburize at a rapid rate at temperatures between 1500° F. and 1600° F. is of considerable importance because certain steels tend to distort during carburization at high temperatures. While I have referred to propane as the preferred carrier gas, it is to be understood that any type of carburizing gas may be employed.

It is to be understood that the furnace disclosed may be employed for either carburizing or heat treating merely by changing the proportion of air to hydrocarbon gas introduced into the cracking chamber 39. In case of heat treating furnaces alone the cracking chamber 39 is not necessary since the composite gas mixture may be burned directly in the chamber 35 and exhausted therefrom into the muffle through the drying and cleaning apparatus 43, 48 and 44. However, where the chamber 39 is supplied with a combustible mixture, combustion occurs therein and the burner 37 is required only to bring the chamber 39 up to the ignition temperature of the combustible mixture, after which it may be extinguished.

It is obvious, of course, that many variations may be made in the arrangement and construction of the various component parts of the furnace, and therefore I do not desire to be limited to the specific means disclosed but contemplate all obvious changes therein as come within the scope of the appended claims.

What I claim is:

1. The method of producing a lithiated furnace atmosphere comprising generating a carrier gas by reaction of air with a hydrocarbon fuel, cooling said gas to eliminate a portion of the water vapor therefrom, heating a compound of lithium to a sufficient temperature to produce a vapor thereof, passing said carrier gas over said heated compound to entrain said vapors, and introducing said vapor laden carrier gas into the heating chamber of a furnace.

2. The method of producing a lithiated furnace atmosphere comprising generating a carrier gas by reaction of a hydrocarbon fuel, heating a compound of lithium to a sufficient temperature to produce a vapor thereof, passing said carrier gas over said heated compound to entrain said vapors, and introducing said vapor laden carrier gas into the heat chamber of a furnace.

3. The method of producing a lithiated furnace atmosphere comprising removing the major portion of the water from a carrier gas composed of at least one of the group consisting of methane, carbon monoxide, carbon dioxide, hydrogen, nitrogen, and air, heating a compound of lithium to a sufficient temperature to produce a vapor therefrom, passing said carrier gas over said heated compound to entrain said vapor, and introducing said vapor laden carrier gas into the heating chamber of a furnace.

4. The method of producing a dry atmosphere comprising generating a gaseous medium at an elevated temperature, cooling said medium to eliminate a portion of the water vapor therein, reheating said gas to an elevated temperature and eliminating the residual water vapor and that formed by reheating of the gas, by reaction with lithium at said elevated temperature.

5. The method of producing a dry atmosphere in a chamber comprising generating a gaseous medium at an elevated temperature, cooling said medium to eliminate a portion of the water vapor therein, introducing said gas into the chamber and eliminating the residual water vapor within the chamber by means of lithium.

6. The method of producing a carburizing atmosphere in a furnace comprising producing a gaseous carburizing mixture by reaction of a hydrocarbon gas and air at an elevated temperature, removing a substantial portion of the water vapor therefrom, introducing said carburizing mixture into a heating chamber and bringing said mixture in contact with lithium within said chamber to effect a substantial reduction of the water vapor content in said mixture.

7. The method of producing a carburizing atmosphere comprising producing a gaseous carburizing mixture by reaction of a hydrocarbon gas and air at an elevated temperature, removing a substantial portion of the water vapor therefrom by condensation, and bringing said mixture into contact with lithium to eliminate the residual water vapor.

8. The method of producing a non-oxidizing atmosphere in a chamber comprising removing a substantial part of the moisture from a gaseous medium, bringing said gaseous medium in contact with lithium at an elevated temperature and introducing said gaseous medium into the chamber.

9. The method of producing an atmosphere in a metallurgical furnace which is non-staining to metal heated therein comprising removing a substantial part of the water vapor from a gaseous medium, passing said gaseous medium through a receptacle containing a lithium compound, heating said compound to a temperature sufficiently high to produce a volume of vapor capable of reducing substantially all of the residual water vapor in said gaseous medium but insufficiently high to produce a volume of vapor capable of staining metal heated in said gas, and introducing said lithium vapor and gaseous medium into said furnace.

10. The method of producing a protective atmosphere in a metallurgical furnace comprising removing a substantial part of the water vapor from a gaseous medium, passing said gaseous medium through a receptacle containing a lithium vapor generating material, heating said material to a temperature sufficiently high to produce a volume of lithium containing vapor capable of substantially eliminating the residual water in said gaseous medium, and introducing said vapor and gaseous medium into said furnace.

11. The method of producing a dry atmosphere in a furnace comprising generating a gaseous medium by reaction of a hydrocarbon gas and air at an elevated temperature, cooling said medium to eliminate a portion of the water vapor therein, reheating said gas to the furnace temperature and eliminating the residual water vapor and that formed by reheating of the gas by reaction with lithium.

12. The method of producing a protective atmosphere in a metallurgical furnace comprising removing a substantial part of the water vapor from a gaseous medium, passing said gaseous medium through a receptacle containing a lithium vapor generating agent, heating said agent to a temperature sufficiently high to produce a volume of lithium containing vapor capable of reducing the residual water in said gaseous medium, and introducing said lithium containing vapor and gaseous medium into said furnace.

13. The method of producing a protective atmosphere in a metallurgical furnace comprising removing a substantial part of the water vapor from a gaseous medium, passing said gaseous medium through a receptacle containing a lithium chloride, heating said lithium chloride to a temperature sufficiently high to produce a volume of vapor capable of reducing the residual water in said gaseous medium, and introducing said vapor and gaseous medium into said furnace.

14. The method of producing a protective atmosphere in a metallurgical furnace comprising removing a substantial part of the water vapor from a gaseous medium, passing said gaseous medium through a receptacle containing a lithium carbonate, heating said lithium carbonate to a temperature sufficiently high to produce a volume of vapor capable of reducing the residual water in said gaseous medium, and introducing said vapor and gaseous medium into said furnace.

15. The method of producing a protective atmosphere in a metallurgical furnace comprising removing a substantial part of the water vapor from a gaseous medium, passing said gaseous medium through a receptacle containing a mixture of lithium carbonate and lithium chloride, heating said mixture of lithium carbonate and lithium chloride to a temperature sufficiently high to produce a volume of vapor capable of reducing the residual water in said gaseous medium, and introducing said vapor and gaseous medium into said furnace.

16. The method of producing a lithiated atmosphere comprising a mixture of a hydrocarbon fuel and air through a closed chamber, heating said chamber externally to effect a reaction between said hydrocarbon fuel and air, removing a portion of the water vapor from said reaction products and bringing said reaction products in contact with lithium or a compound thereof at an elevated temperature.

17. The method of producing a dry gas atmosphere comprising heating a lithium containing material to a sufficient temperature to produce a lithium containing vapor therefrom, passing a gas composed of at least one of the group consisting of methane, carbon monoxide, carbon dioxide, hydrogen, nitrogen and air over said heated material to entrain said vapor, and maintaining said gaseous medium at a sufficient temperature to retain said vapor therein until chemical reduction of the water vapor in said medium is effected by said vapor.

18. The method of producing a dry gas atmosphere in a chamber comprising producing a vapor containing lithium externally of said chamber, passing the gas to be dried in contact with said vapor at a sufficiently high temperature to effect a reaction between said vapor and the water contained in said gas and introducing said gas into said chamber.

19. The method of producing a lithiated gas atmosphere comprising heating a lithium vapor generating material in a receptacle to produce a lithium containing vapor continuously and at a slow rate, over a substantial period, and flowing a gas through said receptacle during said period, to effect an entrainment of said vapor as it is generated.

HAROLD J. NESS.